No. 12,739. REISSUED JAN. 14, 1908.

J. J. GHEGAN.

TELEGRAPH SYSTEM.

APPLICATION FILED DEC. 7, 1907.

WITNESSES

Walter Abbe

L. H. Grote

INVENTOR

John J. Ghegan

BY

Howson and Howson

ATTORNEYS

UNITED STATES PATENT OFFICE.

JOHN J. GHEGAN, OF NEWARK, NEW JERSEY.

TELEGRAPH SYSTEM.

No. 12,739. Specification of Reissued Letters Patent. Reissued Jan. 14, 1908.

Original No. 872,228, dated November 26, 1907. Serial No. 385,440. Application for reissue filed December 7, 1907. Serial No. 405,629.

*To all whom it may concern:*

Be it known that I, JOHN J. GHEGAN, a citizen of the United States of America, residing in the city of Newark, in the county of Essex, in the State of New Jersey, have invented certain new and useful Improvements in Telegraph Systems, of which the following is a specification.

In quadruplex telegraph systems employing neutral and polarized relays, there is experienced a practical difficulty because of the production of false signals or "kicks" in the local sounder of the neutral relay through the action upon the latter of the working of the pole changing transmitter, this "kick" being produced at the moment of reversal or no-current. This difficulty is well known, and attempts have been made to overcome it, but not with entire success.

The object of my invention is to eliminate this false signal or "kick" difficulty and this I accomplish by providing means controlled by the armature of the neutral relay to act on its local sounder circuit so that the sounder will be unaffected.

Figure 1:
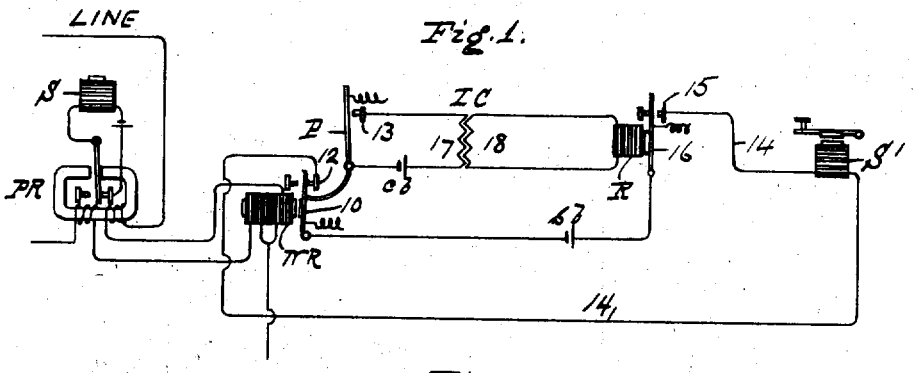
Figure 2:
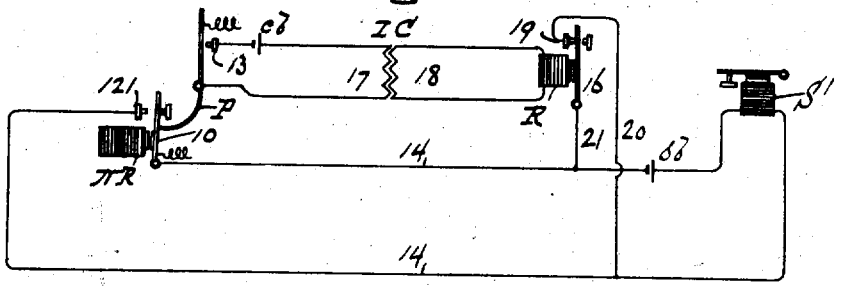
Figure 3:
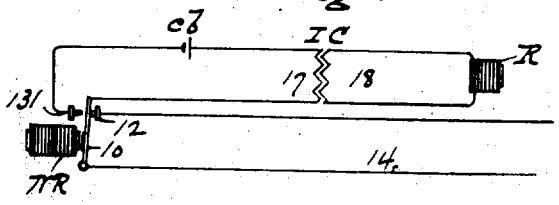

In the accompanying drawings Figure 1 is a diagram illustrating one form of my invention; Fig. 2 is a diagram of a modification; and Fig. 3 is a diagram illustrating another modification.

In these diagrams I have omitted, for the sake of clearness, illustration of those parts of the usual quadruplex system which form no essential part of my invention, and which are well known and common in the art.

Fig. 1 represents some of the devices at one of the stations on the line, and N. R. indicates the ordinary differentially wound neutral relay, which is supposed to respond only to changes of potential at the distant end, regardless of polarity, while P. R. indicates the polarized relay, at the same station with its local sounder S. In practice, at the instant of no current of high potential reversals at the distant end to operate the polarized relay P. R. at the receiving end, the neutral relay N. R. at the receiving end will be affected to produce a false signal or "kick" in its sounder as ordinarily connected. This sounder is indicated in Fig. 1 at S' and is shown as connected in a local circuit 14 with battery *a b*, this local circuit being closed to actuate the sounder by withdrawal of the armature lever 10 under the action of its spring 11 against the back stop 12.

In that form of my invention which is shown in Fig. 1, I eliminate the false "kick" by providing means for momentarily opening the local sounder circuit 14 at the instant it would otherwise be closed by the neutral relay armature. For this purpose I may provide adjacent to the armature lever 10, a lever P, one end of which lies in the path of the lever 10, while the other end normally bears against a stop 13 in a circuit containing a battery *c b* and primary coil 17 of an induction coil I. C. The secondary coil 18 of this induction coil is in closed circuit with an electromagnet R, with its armature lever 16 normally held against a stop 15 in the local sounder circuit 14, the armature lever 16 being also in that circuit.

The operation of this arrangement is as follows:—When the armature lever 10 of the neutral relay N. R. is released at the moment of "no current", and is drawn back by its spring 11 towards its back stop 12, it first strikes the lower end of lever P and draws its upper end away from stop 13, thus breaking the local cricuit containing the primary 17 of the induction coil I. C. This causes a momentary current in the secondary circuit and a like momentary energizing of the electromagnet R. This moment of energy is sufficient to attract the armature 16 and to therefore break the local sounder circuit for an instant at 15, as indicated in the diagram, Fig. 1; and consequently the false signal is prevented from being sounded at S.

It will be understood, of course, that this interruption of the sounder circuit being only momentary, it does not materially interfere with the varying potential signals sent from the transmitter at the distant station.

Instead of thus breaking the local sounder circuit of the neutral relay to prevent false signals, I may accomplish the same result by momentarily short circuiting the local circuit contacts of the neutral relay, as indicated in the diagram, Fig. 2. This diagram corresponds as to the main parts with that shown in Fig. 1, but instead of providing for a break in the local circuit 14 at the back stop 15 (Fig. 1), I make that circuit continuous from the battery *s b* to the sounder S, (Fig. 2), and I provide a short circuit across the circuit 14 between the relay N R and sounder S by connecting a wire 21 from an armature lever 16 and a wire 20 from the front stop of that armature. I have also shown the neutral relay as arranged to close its local sounder circuit 14 on its front stop 121, as will be readily understood. When the backward movement of the armature lever 10 causes the breaking of the circuit containing the primary 17, and the electromagnet is thereby momentarily energized and its armature lever 16 attracted, the contacts of the neutral relay will be for the instant short circuited through the wire, lever 16, stop 19, and wire 20, to prevent the sounding of the false signal.

It will be understood that the lever P may be dispensed with, and the circuit of the primary coil 17 broken by other suitable means, such as the provision of extra contacts on the armature lever of the neutral relay N. R., thus in Fig. 3 I have indicated that armature lever as adapted to coöperate with a contact 131 in the circuit of the said primary to attain the same results as heretofore described with reference to Figs. 1 and 2.

This invention for preventing false signals may be applied to all telegraph lines, where the induction is so heavy as to cause chattering or vibration of a relay armature as well as on lines operated by rapidly alternating currents.

I claim as my invention

1. A telegraphic instrument comprising a relay and its armature and a local sounder controlled by the relay in combination with means, including an induction coil, controlled by the armature of the relay, to act on the local sounder circuit to prevent false signals.

2. A telegraph instrument, comprising a relay and its armature and a local sounder controlled by the relay in combination with means controlled by the armature of the relay to momentarily open the local sounder circuit of the relay to prevent false signals.

3. A telegraph instrument, comprising a relay and its armature and a local sounder controlled by the relay in combination with means, including an induction coil, controlled by the armature of the relay to momentarily open the local sounder circuit of the relay to prevent false signals.

4. A quadruplex telegraph system, having a neutral relay and a polarized relay and their local sounder circuits in combination with means, including an induction coil, controlled by the armature of the neutral relay to act on the local sounder circuit of the neutral relay to prevent false signals.

5. A quadruplex telegraph system, having a neutral relay and a polarized relay and their local sounder circuits in combination with means controlled by the armature of the neutral relay to momentarily open the local sounder circuit of the neutral relay to prevent false signals.

6. A quadruplex telegraph system, having a neutral relay and a polarized relay and their local sounder circuits in combination with means, including an induction coil, controlled by the armature of the neutral relay to momentarily open the local sounder circuit of the neutral relay to prevent false signals.

In testimony whereof I have signed my name to this specification, in the presence of two subscribing witnesses.

JOHN J. GHEGAN.

Witnesses:
L. H. GROTE,
HUBERT HOWSON.